Dec. 5, 1967  B. TOONE  3,355,885
PRIME MOVER IGNITION DEVICE
Filed Nov. 15, 1965  3 Sheets-Sheet 2
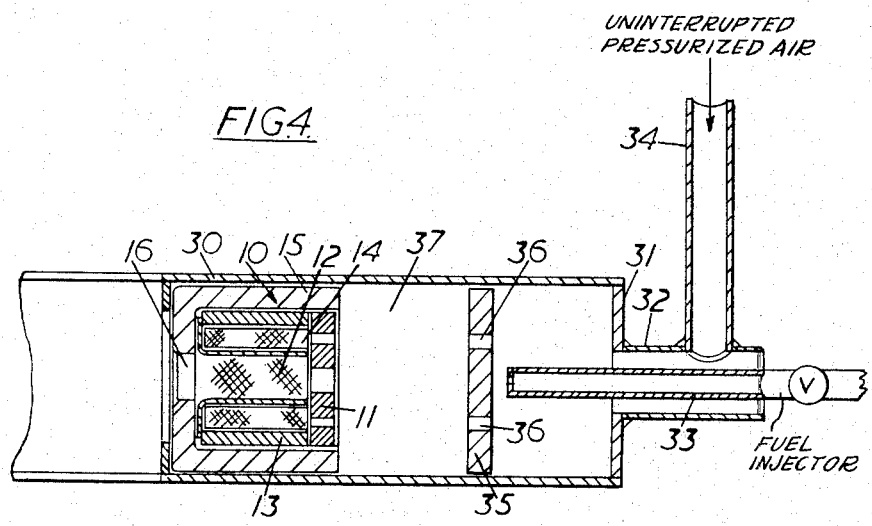
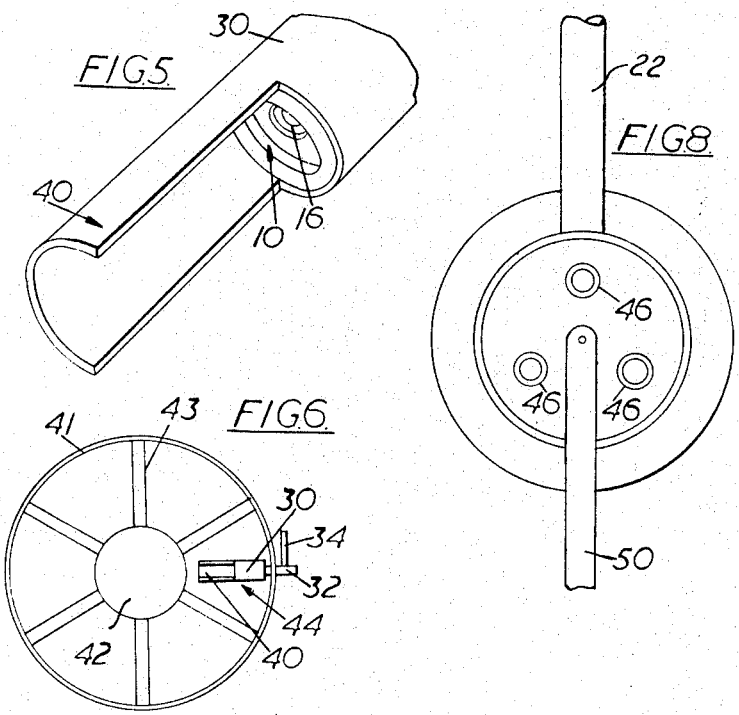
Inventor
Brian Toone
By
Cushman, Darby & Cushman
Attorneys

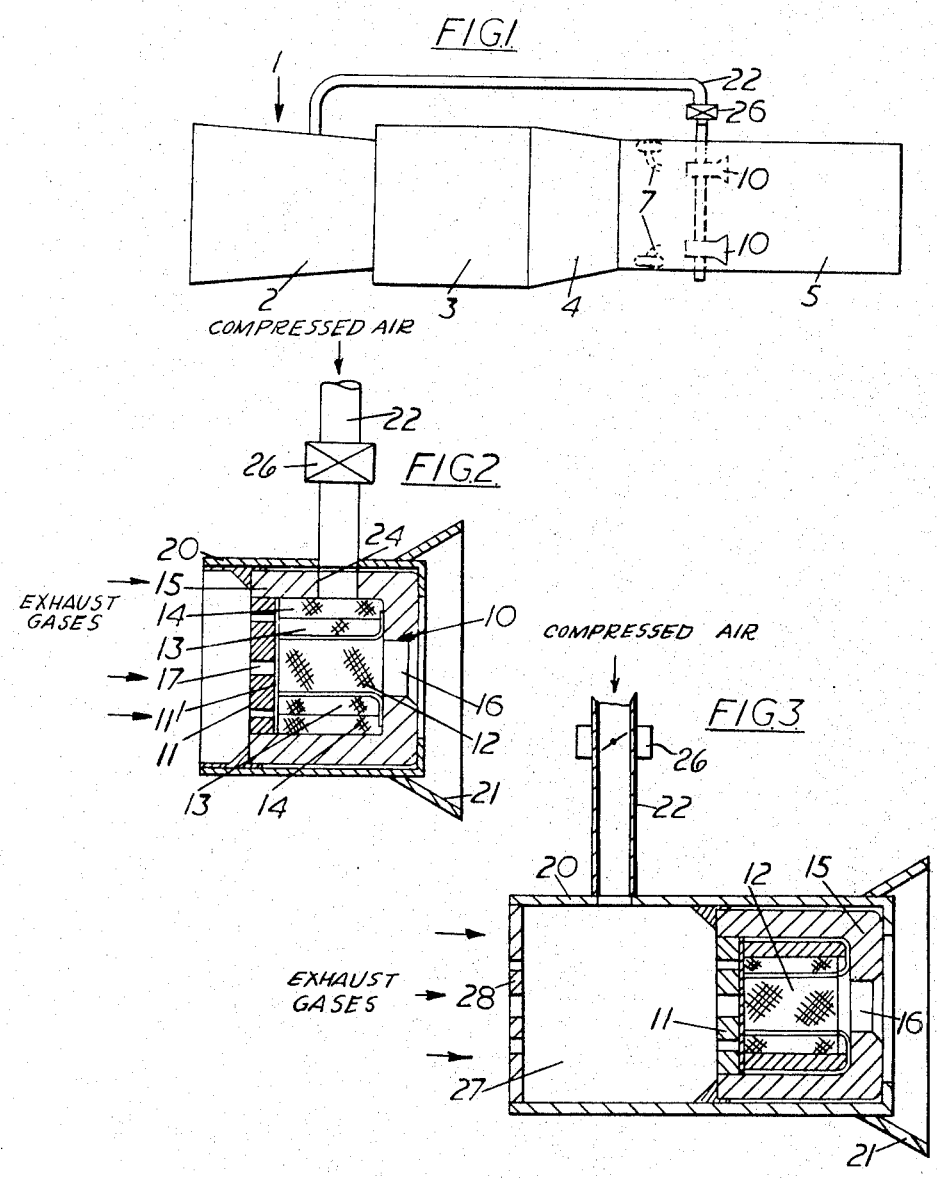

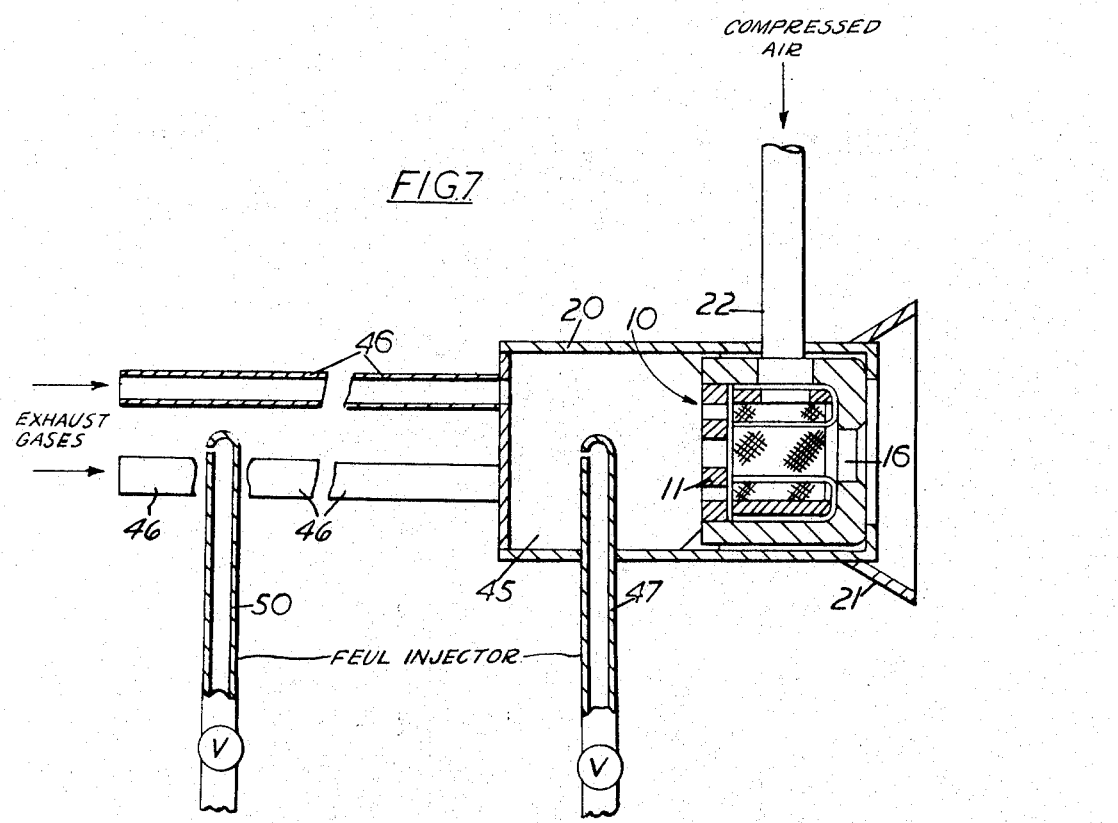

United States Patent Office 3,355,885
Patented Dec. 5, 1967

3,355,885
PRIME MOVER IGNITION DEVICE
Brian Toone, Littleover, Derby, England, assignor to Rolls-Royce Limited, Derby, England, a British company
Filed Nov. 15, 1965, Ser. No. 507,809
Claims priority, application Great Britain, Nov. 19, 1964, 47,264/64
9 Claims. (Cl. 60—39.82)

ABSTRACT OF THE DISCLOSURE

A system is described for flushing catalytic ignition devices used in reheat combustion equipment mounted in the jet pipe of a gas turbine engine. The catalytic ignition devices are flushed with compressed air, at least during the time that the reheat combustion equipment is turned off, and compressed air is supplied to the ignition devices from the compressor equipment of the gas turbine engine.

---

This invention concerns a prime mover ignition device. Although not so restricted, the invention will hereinafter be described with reference to its use in the reheat combustion equipment of a gas turbine jet propulsion engine in which it is desired to initiate combustion of a relatively high speed mixture of fuel and combustion supporting gas (such as the exhaust gases which always contain some available oxygen).

According to the present invention there is provided a prime mover ignition device for promoting ignition of fuel injected into a stream of combustion supporting gas, the device being, in operation, disposed in said stream and including a mass of refractory material having a flow passage therein which is open to said stream and in which is mounted at least one catalytic element. Compressed air supply means is provided for supplying the flow passage with compressed air at least while the device is not brought into operation to prevent exhaust gases and other contaminants in said stream from flowing through said flow passage.

By preventing fuel and its combustion products from flowing through the flow passage of the igniter "poisonous" components in the fuel or combustion products such, for example, as lead compounds cannot contaminate the igniter when it is not in use. Accordingly the life of the igniter is increased substantially.

Preferably, an air duct is provided for supplying the said flow passage with compressed air when the device is not in use.

The air duct may contain a valve therein which may be opened and closed to permit and prevent air flow through the air duct.

The said mass of refractory material may be mounted in a housing, the said air duct supplying air to the said housing, on the upstream side of the catalytic element for flow through said flow passage. Thus means may be provided for supplying the said housing, on the said upstream side, with fuel during operation of said device, means being provided to ensure that the said fuel and compressed air mix on the said upstream side prior to flowing through said flow passage.

In a preferred embodiment a perforated plate is mounted within the housing on the upstream side of the said mass of refractory material, the perforated plate being spaced from said mass to provide a mixing chamber within which the said fuel and compressed air mix.

The downstream end of the housing may be cut away to form a gutter which is arcuate in cross section. Thus the housing may be cylindrical and the gutter may be semi-cylindrical.

A plurality of fuel injectors may be provided, at least one of said fuel injectors directing its fuel to flow through said flow passage, and at least one other of said fuel injectors directing its fuel to avoid said flow passage but to pass to a region in which it will be ignited by the combustion of the fuel which has flowed through the flow passage. Preferably, the greater part of the fuel from said plurality of fuel injectors does not pass through the flow passage.

The invention also includes a prime mover provided with an ignition device as set forth above. The prime mover may be a gas turbine jet propulsion engine provided with a device as set forth above mounted in its jet pipe.

The invention is illustrated, merely by way of example, in the accompanying drawings, in which—

FIGURE 1 is a diagrammatic view of a gas turbine jet propulsion engine having reheat combustion equipment incorporating ignition devices according to the present invention, FIGURE 2 is a part-sectional elevation of an ignition device as shown in FIGURE 1, FIGURES 3 and 4 are part sectional elevations of alternative embodiments of an ignition device according to the present invention, FIGURE 5 is a perspective view of part of the device of FIGURE 4, FIGURE 6 is an end elevation of the exhaust pipe of a gas turbine jet propulsion engine including the igniter device of FIGURES 4 and 5, FIGURE 7 is a part-sectional view of another embodiment of the invention, and FIGURE 8 is an end view of the structure shown in FIGURE 7.

In FIGURE 1 there is shown a gas turbine engine 1 having in flow series one or more compressors 2, main combustion equipment 3, and one or more turbines 4, the exhaust gases which have passed through the turbine or turbines 4 passing to atmosphere through a jet pipe 5.

Mounted in the jet pipe 5 is reheat combustion equipment comprising a plurality of reheat fuel injectors 7, for injecting reheat fuel into the exhaust gases, flowing through the jet pipe 5, and a plurality of catalytic igniters 10 for promoting ignition of the reheat fuel in the uncombusted oxygen forming part of the said exhaust gases. Each of the catalytic igniters 10 is of the type described in detail in British Patent No. 948,578.

As shown in FIGURE 2, each of the catalytic igniters 10 comprises a perforated upstream plate 11, a gauze plate 11' which produces turbulence in gases flowing therethrough, an inner cylinder 12 of catalytic gauze, and a plurality of "satellite" cylinders 13, 14 of catalytic gauze disposed around the inner cylinder 12, the "satellite" cylinders 13, 14 being arranged in two radially spaced annular rows. These components are disposed within a refractory mass or housing 15 open at its upstream end and closed at its downstream end, the downstream end being perforated to form a passage 16. The upstream end of housing 15 is closed by the perforated plate 11. A central aperture 17 in the plate 11 communicates with the passage 16 via the interior of the cylinder 12 and thus forms a flow passage through the catalytic device.

The refractory housing 15 is fixed within a cylindrical housing 20 which is open at its upstream end to the flow of exhaust gases and is provided at its downstream end with a frusto-conical portion 21 providing a sheltered zone within which combustion can occur. An air pipe or duct 22, which receives compressed air from the compressor or compressors 2, communicates with the housing 20 and is aligned with a radial aperture or bore 24 in the housing 15 to thereby form a radial flow passageway for the compressed air.

Compressed air may thus pass into the interior of the catalytic igniter 10 through the cylinders 14 and into the interior of the cylinder 12 passing outwardly through the flow passage 16. The presence of compressed air within the catalytic igniter prevents the passage therethrough of the said exhaust gases, the said exhaust gases having entrained therein combustion products from the fuel which has been burned in the main combustion equipment 3 and (possibly) some unburnt fuel. By preventing the exhaust gases from passing through the device when the latter is not in use, contamination and poisoning of the catalytic gauze by, for example, lead compounds contained in the exhaust gases is reduced.

A valve 26 is provided in the pipe 22 to cut off the air supply to each catalytic igniter 10 when it is required to use the latter to promote ignition of reheat fuel from the injectors 7. When the air supply has been cut off, the reheat fuel is turned on and thereafter ignition is effected by the catalytic igniter 10.

In FIGURE 3 there is shown an ignition device which is similar to that of FIGURE 2 and which for this reason will not be described in detail, like reference numerals indicating like parts. In the FIGURE 3 arrangement, however, the pipe 22, instead of communicating with the radial aperture 24, communicates with a chamber 27 in the upstream portion of the housing 20, the housing 20 having an apertured plate 28 at its upstream end. The chamber 27 communicates with the flow passage 16.

Referring now to the embodiment of FIGURES 4 to 6, the catalytic igniter 10, which is similar to that illustrated in FIGURE 2, is disposed within the housing 15 which itself is fixed within a cylindrical housing 30. The upstream end of the cylindrical housing 30 is closed by an end plate 31, a central aperture in which has attached thereto an air pipe or duct 32. Concentrically mounted within the pipe 32 is a fuel injector pipe 33, and attached to the pipe 32 is a branch pipe 34 through which compressed air may be supplied from the compressor or compressors 2. Disposed within the cylindrical housing 30 and spaced upstream of the perforated plate 11 is a turbulence plate 35 which is perforated as at 36. Plate 35 defines with plate 11 a mixing chamber 37.

Downstream of the catalytic igniter 10 the cylindrical housing 30 is cut away as shown in FIGURE 5 to provide a semi-cylindrical gutter 40.

The device is disposed within the jet pipe 41 of a gas turbine jet propulsion engine as shown in FIGURE 6 which is an end view looking into the rear end of the engine. The jet pipe 41 has a central nose bullet 42 supported by six radially disposed vanes 43. A plurality of igniter devices of which only one is shown at 44 are disposed radially within the jet pipe 41 with the upstream end 31 disposed radially outermost. The devices are so disposed that the gutters 40 are open at their downstream ends within the jet pipe and thus the gutters form sheltered zones which are sheltered from the flow of exhaust gases through the engine.

Compressed air from the compressor or compressors 2 flows through each pipe 34 at all times thus flowing through the respective cylindrical housing 30, the catalytic igniter 10 and into the gutter 40. This flow of compressed air through the catalytic igniter 10 prevents any of the exhaust gases which are in the jet pipe from passing through the flow passage 16 and into the catalytic igniter 10 and thus prevents contamination of the catalytic gauze by any poisonous substances such, for example, as lead compounds.

When it is desired to use the catalytic igniters 10 for promoting ignition of the reheat fuel, reheat fuel is supplied through each pipe 33 into the respective cylindrical housing. 30. The reheat fuel, together with the air flowing through the respective pipe 34, passes through the turbulence plate 35. The resultant turbulent fuel and air within the mixing chamber 37 mixes together to form a fuel/air mixture which, when passing through the catalytic igniter 10, becomes ignited. This ignited mixture flows into the sheltered zone provided by gutter 40 and promotes ignition of any fuel in the exhaust gases.

It will be appreciated that a valve need not be provided in the pipes 34 in the embodiment of FIGURES 4 to 6 since compressed air is supplied to the catalytic igniters 10 at all times whether or not the igniters are in use.

In FIGURES 7 and 8 there is shown an embodiment of the invention which employs catalytic igniters 10 which are generally similar to that of FIGURE 2 and which will not therefore be described in detail.

In the embodiment of FIGURES 7 and 8, however, at least one catalytic igniter 10 is used which has a chamber 45 in the upstream portion of its housing 20, the chamber 45 receiving exhaust gases through pipes 46. Mounted in the chamber 45 is a reheat fuel injector 47, reheat fuel from the injector 47 mixing with the oxygen-containing exhaust gases in the chamber 45 and then passing through the flow passage 16 of the catalytic igniter 10 to be ignited thereat.

Only a minor proportion, however, of the reheat fuel is supplied to the injector 47, the major proportion thereof being supplied to a reheat fuel injector 50 the fuel from which does not pass through the flow passage 16 but passes to the downstream end of the catalytic igniter 10 where it is ignited by the combustion of the fuel which has passed through the flow passage 16.

The arrangement of FIGURES 7 and 8 thus ensures that only a very small amount of fuel needs to be supplied to the catalytic igniter 10.

I claim:
1. An improved prime mover ignition device for more reliably promoting ignition of fuel injected into a stream of combustion supporting gas containing contaminates harmful to catalytic agents, the device being disposed in the gas stream, said improved device comprising a mass of refractory material having a flow passage therethrough which is open to flow therein of said gas stream and in which is mounted at least one catalytic element, and including compressed air supply means for flushing the flow passage with compressed air at least while the ignition device is not brought into operation to prevent said gas stream from flowing into said flow passage.

2. A device as claimed in claim 1 in which said compressed air supply means includes an air duct which has a valve therein for selectively opening and closing the duct to control air flow through the air duct.

3. A device as claimed in claim 1 in which the said mass of refractory material is mounted in a housing, and wherein said compressed air supply means comprises an air duct for supplying air to the said housing, at one side of the catalytic element, for flow through said flow passage.

4. A device as claimed in claim 3 in which means are provided for supplying the said housing, on the said one side, with fuel during operation of said device, means being provided to ensure that the said fuel and compressed air mix on the said one side prior to flowing through said flow passage.

5. A device as claimed in claim 4 in which a perforated plate is mounted within the housing between said means for supplying fuel and the said mass of refractory material, the perforated plate being spaced from said mass to provide a mixing chamber within which the said fuel and compressed air mix.

6. A device as claimed in claim 3 in which the end of said housing on the side of said catalytic element opposite to said one side is cut away to form a gutter which is arcuate in cross section.

7. A device as claimed in claim 1 in which a plurality of fuel injectors are provided, at least one of said fuel injectors directing its fuel to flow through said flow passage, and at least one other of said fuel injectors directing its fuel to avoid said flow passage but to pass to a region in which it will be ignited by the combustion of the fuel which has flowed through the flow passage.

8. A device as claimed in claim 7 in which the amount of fuel from said at least one fuel injector is arranged to be a relatively small proportion of the total amount of fuel supplied to said plurality of fuel injectors.

9. In a gas turbine jet propulsion engine having an exhaust duct adapted to contain a high-velocity combustion supporting gas stream containing contaminates harmful to catalytic agents, and having at least one catalytic ignition device positioned in said gas stream, the improvement comprising a catalytic ignition device having a mass of refractory material with a flow passage therethrough which is open to flow therein of said gas stream and in which is mounted at least one catalytic element, and compressed air supply means for flushing the flow passages with compressed air at least while the ignition device is not brought into operation to prevent said gas stream from flowing into said flow passage.

References Cited

UNITED STATES PATENTS

| | | | |
|---|---|---|---|
| 2,970,439 | 2/1961 | Berl | 60—39.82 |
| 3,136,125 | 6/1964 | Toone et al. | 60—39.82 |
| 3,154,920 | 11/1964 | Nash et al. | 60—39.82 |
| 3,156,094 | 11/1964 | Nash et al. | 60—39.82 |

FOREIGN PATENTS

| | | |
|---|---|---|
| 612,060 | 10/1948 | Great Britain. |

JULIUS E. WEST, *Primary Examiner.*